Figure 6:
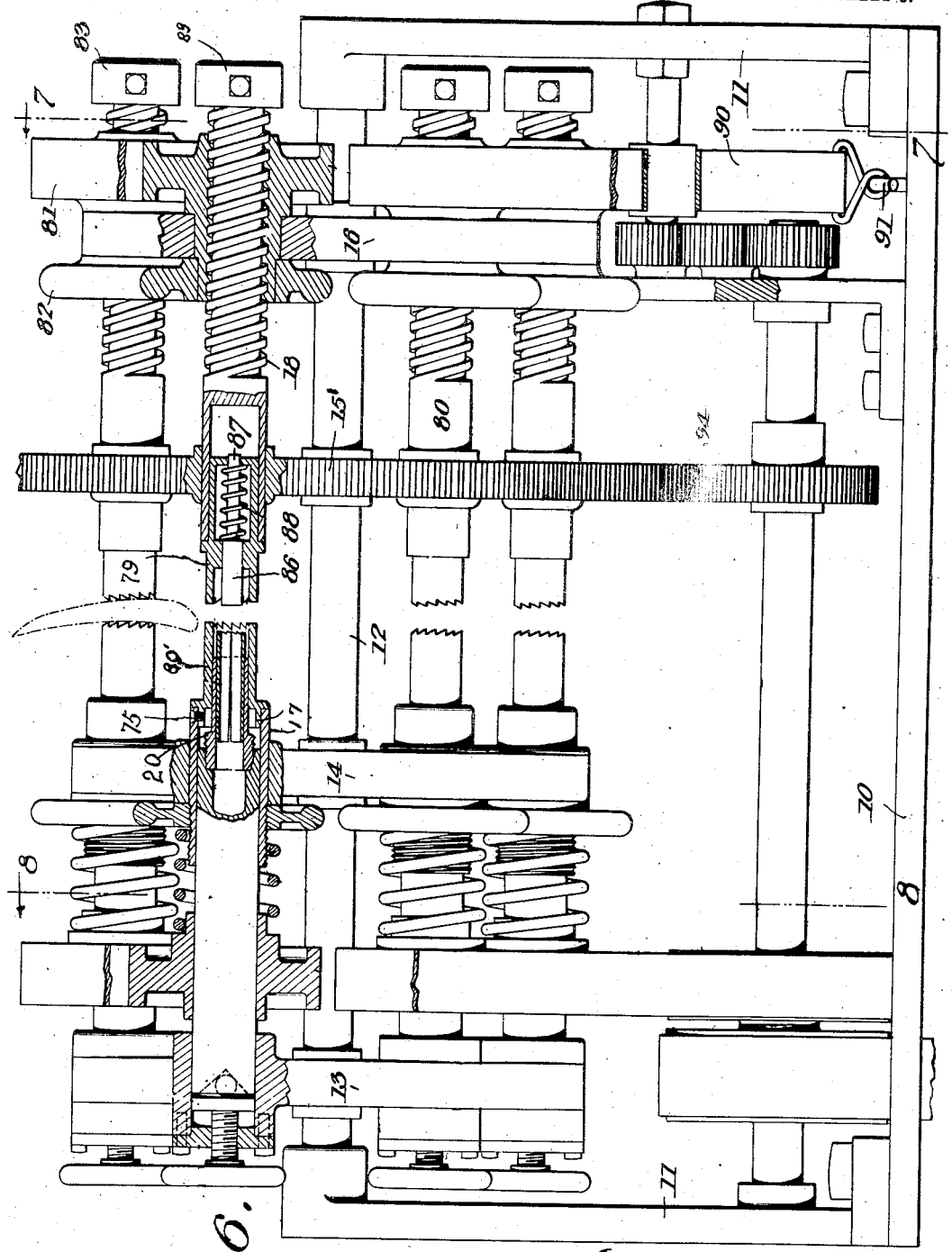

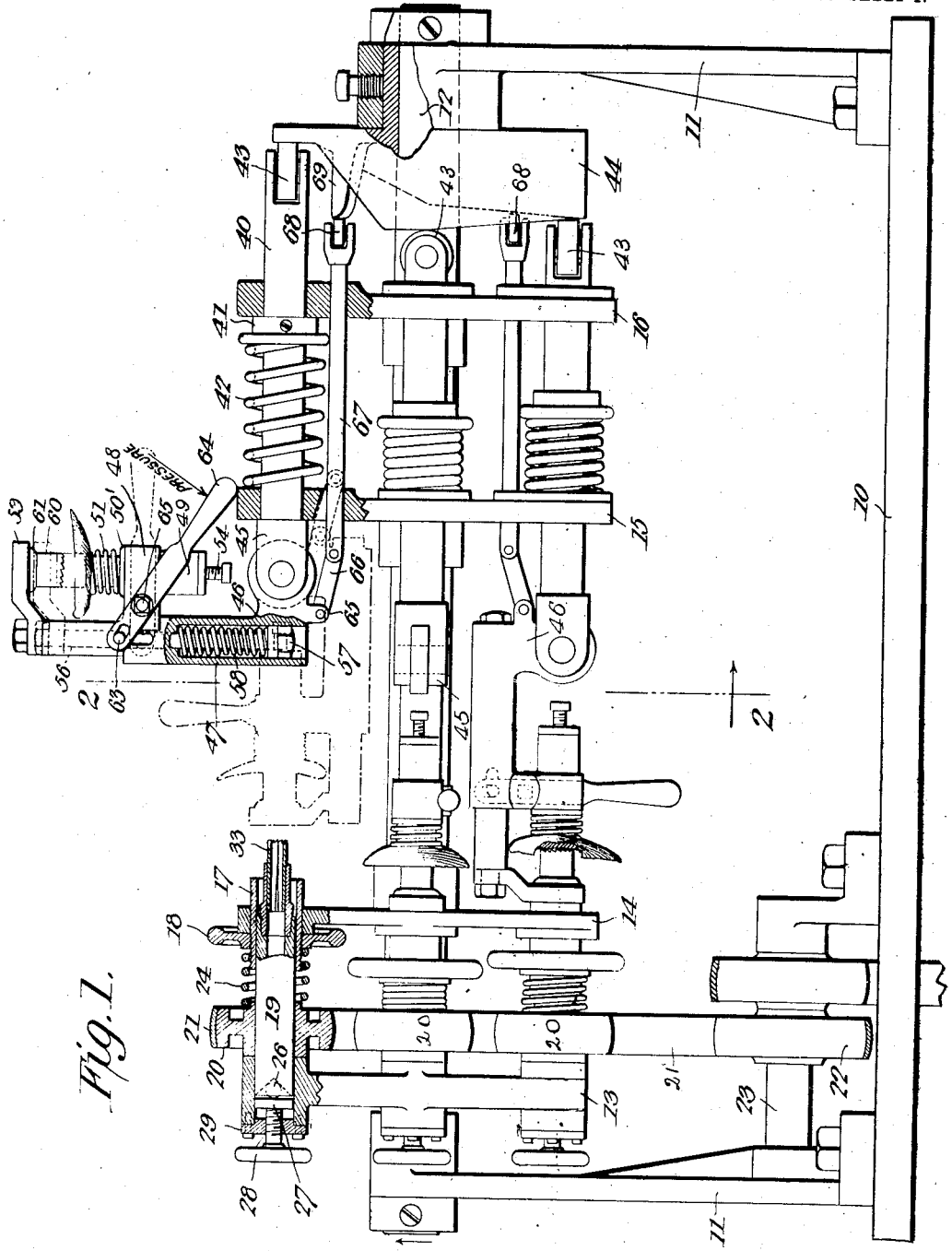

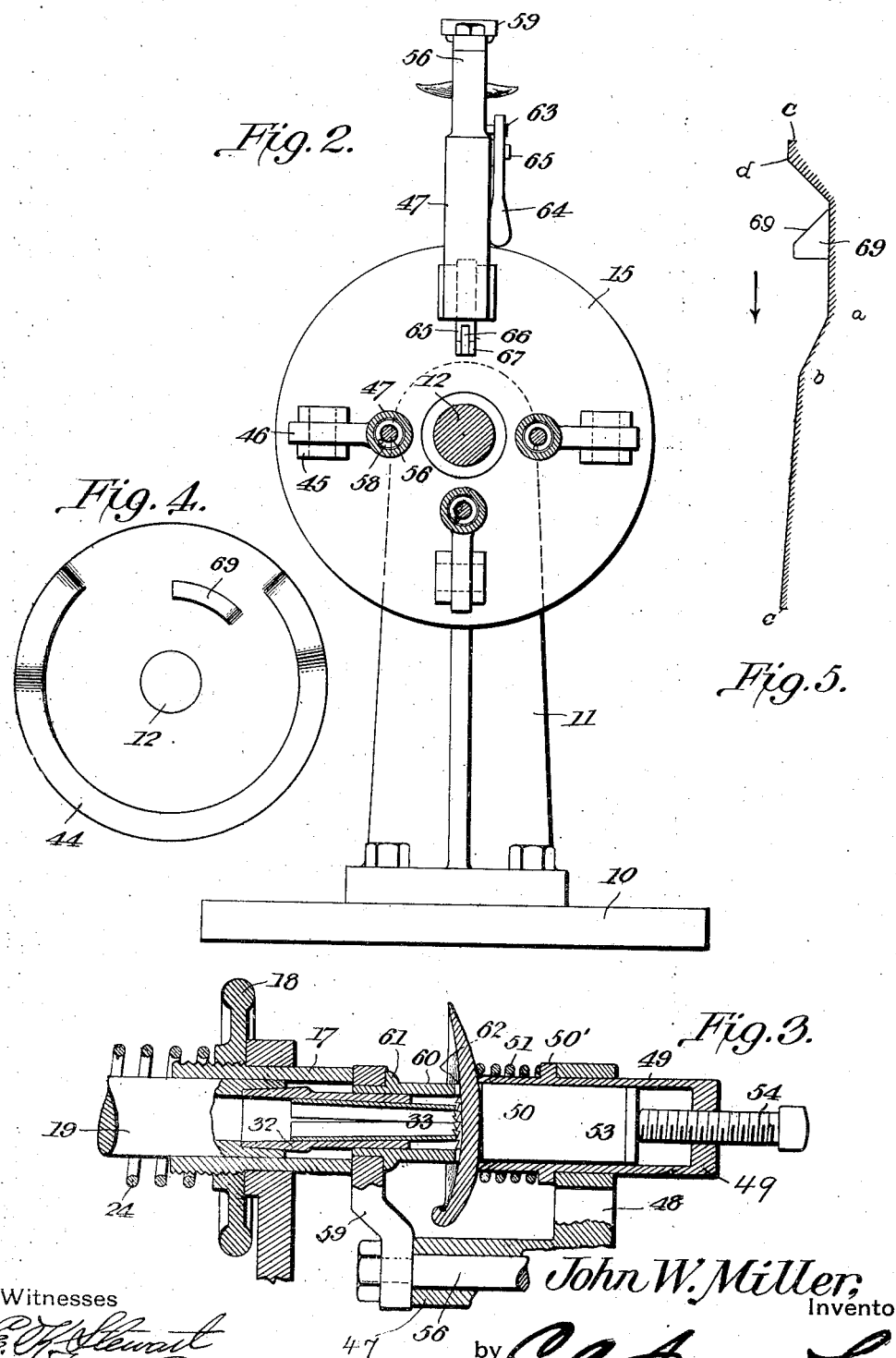

No. 850,033. PATENTED APR. 9, 1907.
J. W. MILLER.
AUTOMATIC BUTTON CUTTING AND SAWING MACHINE.
APPLICATION FILED APR. 29, 1905.

4 SHEETS—SHEET 3.

Witnesses

John W. Miller, Inventor.
by C. A. Snow & Co,
Attorneys

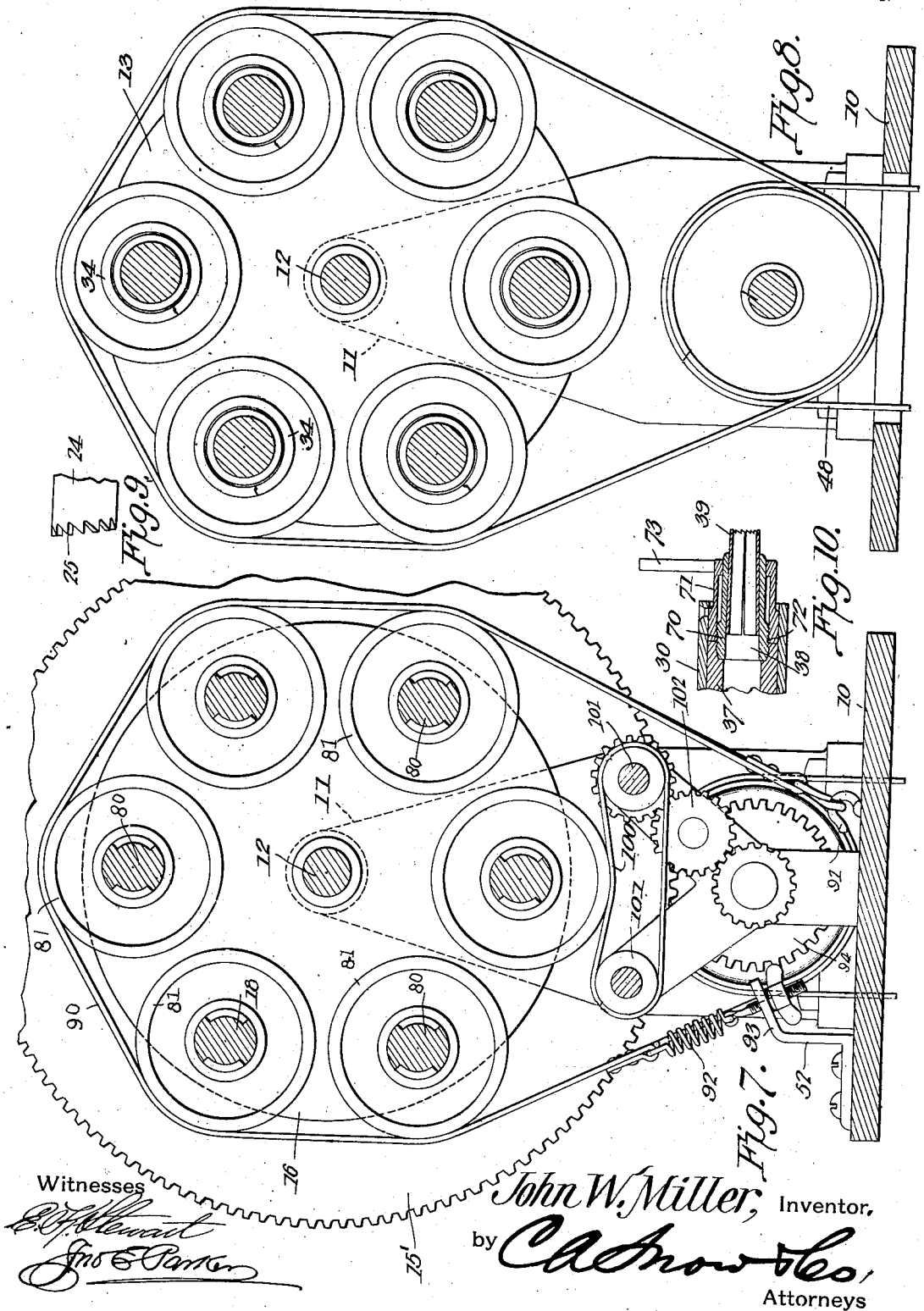

UNITED STATES PATENT OFFICE.

JOHN W. MILLER, OF MUSCATINE, IOWA, ASSIGNOR OF THREE-FIFTHS TO THE McKEE AND BLIVEN BUTTON COMPANY, OF MUSCATINE, IOWA, A PARTNERSHIP.

AUTOMATIC BUTTON CUTTING AND SAWING MACHINE.

No. 850,033.  Specification of Letters Patent.  Patented April 9, 1907.

Application filed April 29, 1905. Serial No. 258,084.

*To all whom it may concern:*

Be it known that I, JOHN W. MILLER, a citizen of the United States, residing at Muscatine, in the county of Muscatine and State of Iowa, have invented a new and useful Automatic Button Cutting and Sawing Machine, of which the following is a specification.

This invention relates to machines for cutting buttons and similar circular blanks or disks from shells or the like, its principal object being to provide a machine in which the working capacity is materially increased, a single workman being able to accomplish the same amount of work and with less effort than three or four workmen provided with machines of the usual character.

A further object of the invention is to provide a button or disk cutting machine with means for supporting the material during the cutting operation.

A still further object of the invention is to provide a button or disk cutting machine of the crown-saw type in which a shell or similar article is positively held and advanced toward the saws by automatically-operated mechanism.

A still further object of the invention is to provide a machine more or less automatic in its nature and of such construction that in the event of the saw remaining inoperative owing to the nature of the shell, the condition of the saw, or for any other reason the breaking of any part of the mechanism will be prevented.

A still further object of the invention is to provide a machine in which the work clamps or holders may be moved outward from the machine in convenient position for the adjustment of the shell or other article to be cut.

A still further object of the invention is to provide a machine of this type in which the work-clamps are moved automatically to a substantially vertical position to permit inspection of the shell by the workman as the shell is being adjusted in the clamps.

A still further object of the invention is to provide a novel form of work clutch or clamp that will automatically conform to irregularities in the shape of the object to be clamped.

A still further object of the invention is to provide a machine of this type in which a pair of work-clamping jaws are so arranged that one of them may be moved from a position in alinement with the saw or other operative position to an inoperative position for readjustment of the shell.

With these and other objects in view, as will more fully hereinafter appear, the invention consists in certain novel features of construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is an elevation, partly in section, of a blank or disk cutting machine constructed in accordance with the invention. Fig. 2 is a sectional elevation of the same on the line 2 2 of Fig. 1. Fig. 3 is a detail sectional view illustrating more particularly the construction of the work-clamps and the cutting-saw. Fig. 4 is an elevation of the stationary cam for advancing the work-clamps and for adjusting the clamps to inoperative position. Fig. 5 is a development of the cam. Fig. 6 is a view corresponding to Fig. 1, illustrating a modified construction of machine. Figs. 7 and 8 are sectional elevations of the same on the line 7 7 and 8 8, respectively, of Fig. 6. Fig. 9 is a detail view of one of the work-engaging clamps. Fig. 10 is a detail view of the tool employed for removing the crown-saws from their carrying mandrels or spuns.

Similar numerals of reference are employed to indicate corresponding parts throughout the several figures of the drawings.

In the cutting of button blanks and disks from various materials—such, for instance, as shells—it is usual to employ a crown-saw that is rotated while the shell is held by the hand of the workman, the output of a single machine being limited by the cutting speed of the saw and the thickness of the shell.

In carrying out the present invention the output of a single machine is very materially increased by providing means for supporting the shell during the cutting operation and by providing means for automatically feeding the shell with respect to the saw, or vice versa, so that the duty of the workman consists merely in adjusting the shell to proper position, and to aid in this operation the work-clamps are moved outward generally to a vertical position, so that the workman may carefully inspect the inner face of the shell without difficulty.

The working parts of the apparatus are secured on a suitable frame 10, including a pair of standards 11, having bearings for the reception of a horizontally-disposed shaft 12, to which are secured two sets of disks, one set of disks 13 and 14 serving as supports for the cutting members, while the second set of disks 15 and 16 serve as supports for the complementary work-holding devices.

The disk 14 is provided with bearings or guides for the reception of sleeves 17, of which there may be any number four of such sleeves being shown in the construction illustrated in Figs. 1 and 2, and the inner ends of said sleeves project for some distance beyond the inner face of the disk 14 for a purpose hereinafter described. The outer end of each sleeve is provided with a threaded periphery on which is mounted an adjusting-screw 18, which by engagement with the outer face of the disk 14 limits the inward movement of the sleeve 17. The sleeve forms a journal for one end of a hollow shaft 19, the opposite end of which is received within a bearing-opening formed in the disk 13, and on each of the shafts is a pulley 20, around which extends a driving-belt 21, the latter passing also around the driving-pulley 22, mounted on a counter-shaft 23, that is driven from the main shaft of the machine in any suitable manner. Between the inner face of the pulley and the hand-nut 18 is a helical compression-spring 24, tending normally to hold the sleeve 17 inward, with the face of the nut against the outer face of the disk 14.

The outer end of the hollow shaft 19 is recessed for the reception of an antifriction-ball 26, that bears against an adjustable disk 27, forming a thrust-bearing for the shaft, and said disk may be adjusted by a screw 28, which passes through a threaded opening in a cap member 29 at the end of the bearing.

The shaft 19 serves as a support for a chuck 32, that is preferably in the form of a tapered tube arranged for the reception of a crown-saw 33, the latter being of the type ordinarily employed in machines of this class. The toothed end of the saw projects well beyond the inner end of the sleeve 17 and may be adjusted from time to time to compensate for wear.

The two disks 15 and 16 are provided with guiding-openings for the reception of longitudinally-movable non-revoluble stems 40, each of which is provided with a collar 41, and between the collar and the outer face of the disk 15 is a helical compression-spring 42, tending normally to thrust the stem 40 outward or toward the right of the machine and serving at all times to maintain an antifriction-roller 43 at the outer end of the stem in engagement with a stationary cam 44, that is secured to a standard 11.

The inner end of each stem 40 is provided with a pair of pivot-ears 45, to which is connected the work-clamp carriage 46. The carriage 46 includes a tubular body portion 47, from the outer portion of which projects an arm 48, Fig. 3, that is provided with an opening for the reception of a cylindrical clamp 49. This clamp is provided at one end with a plurality of teeth 50, arranged to engage with the outer face of the shell to be cut where the machine is intended to operate on mussel-shells, clam-shells, and the like, and as said articles are usually provided with regularly-curved outer faces the toothed end of the clamp is arranged in a plane oblique to the longitudinal axis of the clamp proper in order to follow the curvature of the shell. The clamp is provided with an annular shoulder or flange 50', which bears against one face of the arm 48, and said flange 50' forms a rest for one end of a compression-spring 51, the opposite end of which normally projects slightly beyond the toothed edge of the clamp and is in a position to form a yieldable support for the shell or other work before the toothed portion of the clamp firmly engages therewith. Within the clamp 49 is arranged a block 53, formed of wood or similar material, and the outer end of the block is engaged by a screw 54, extending through a threaded opening in the end portion of the clamp to permit adjustment of the block as it wears away. This block is intended to come into contact with the crown-saw and to prevent passage of the blanks within the interior of the clamp, all of the blanks being forced to the interior of the crown-saw and delivered in the usual manner.

The tubular portion 47 of the carriage forms a guide for a rod or bar 56, the inner end of which is threaded for the reception of a nut 57, and surrounding the rod or bar is a helical compression-spring 58, that tends to throw the rod or bar rearward. To the inner end of the rod 56 is secured an arm 59, that is provided with an opening for the reception of a cylindrical work-clamp 60, the latter having an annular flange 61, that bears against the outer face of the arm, and being provided with work-engaging teeth 62, that make contact with the inner face of the shell and surround the field of operation of the saw, and when the parts are in operative position this clamp 60 surrounds the saw and fits over the projecting portion of the saw-mandrel 32, as will be evident on reference to Fig. 3. Projecting from the rod 56 is a pin 63, which enters a slot formed in the outer end of a clamp-operating lever 64, that is fulcrumed on a pin 65, projecting from the arm 48. This lever normally occupies a position at a right angle to the horizontal axes of the clamping members, as shown by dotted lines in Fig. 1, and the outer clamp 60 is held firmly against the inner face of the shell by means of the spring 58. When the clamps are moved upward to the vertical or radial position shown in Fig. 1, the outer clamp 60 may be moved from the dotted-line to the full-line position away from the inner face of the shell, so that the latter may be grasped by the workman and adjusted to position for the cutting of another blank. This movement of the parts to present the inner face of the shell in a position for convenient examination and adjustment renders it easy for the workman to operate the machine, and at the same time the articles made are much superior to those made by machines of the ordinary class, for the reason that the workman is enabled to select the best portions of the shell to be cut.

The lower or inner portion of the carriage 46 is provided with a pendent lug or ear 65, that is connected by a link 66 to a rod 67, that passes through guiding-openings formed in the disks 15 and 16, and the outer end of said rod carries an antifriction-roller 68, that is adapted to engage with a cam 69, carried by the cam-disk 44 once during each complete rotation of the shaft 12.

In the operation of the machine, the parts being in the position shown in Fig. 1, the right hand of the workman is supposed to be engaging the lever 64 and holding the same in the position shown in full lines, while the left hand engages the shell for the purpose of adjusting the same into position beneath the clamp 60, it being observed that the inner face of the shell is uppermost and may be minutely examined by the workman. The shell is adjusted on the yieldable support 51, and the lever 64 is gradually allowed to return to the horizontal position shown in dotted lines under the influence of spring 58, whereupon the clamping member 60 will move into engagement with the inner face of the shell, the spring 58 being of sufficient strength to compress the spring 51 until the outer face of the shell rests firmly against the teeth 50 of the clamping member 49. During this release movement of the handle the clamp-carriage is allowed to move from the vertical position shown in full lines in Fig. 1 to the dotted-line position, the two clamping members thus assuming a position in axial alinement with the saw 33. The movement of the shaft 12 and the several disks 13, 14, 15, and 16, which it supports, may be accomplished manually or automatically, and in either case the disks rotate from the operator or clockwise, if the machine be viewed from the right of Fig. 1. As soon as the roller 41 strikes that portion of the stationary cam represented by the incline $ab$ of Fig. 5 the work-carriage is thrust in the direction of its length until the outer clamp 60 passes over the mandrel 32 and the parts assume the positions shown in Fig. 3, with the work-clamp 60 in proper position and the saw ready to commence the cutting operation. During further movement from the point $b$ to the point $c$ of the cam the carriage will be forced forward and the shell will be fed to the saw, gradually cutting a disk from the shell, said disk being received within the saw in the manner common to machines of the class. The cutting operation will have been completed by the time the roller 43 arrives at the point $c$ of the cam, and thereafter a slight dwell occurs from the point $c$ to the point $d$. After passing the point $d$ the roller begins to descend the incline toward $e$, and the spring 42 then acts to draw the carriage rearward, removing the clamp 60 wholly from the saw-mandrel until the arm 59 is clear of the teeth of the saw. A slight further movement brings the roller 68 into engagement with the cam 69, and as rod 67 moves forward the carriage will be thrown outward to a position radial of the shaft 12, and this position may be vertical or at an angle to the vertical, in accordance with the size of the machine and the number of cutters and clamps which it carries. After passing slightly beyond the cam 69 the clamp is wholly under the control of the operator, and he may shift the position of the shell for the cutting of another blank and then turn the work-clamp down to the horizontal position and push the disks forward for another cutting operation. The revolving of the disks may be accomplished by hand or may be accomplished by any suitable driving mechanism. During the feeding movement of the clamps the arm 59 engages against the sleeve 17, and the latter is forced inward against the stress of the spring 54, while the saw 33 retains its position, there being no longitudinal movement of the saw except such as may be accomplished by the adjusting of the screw 28. This permits the feeding of the work inward past the saw, and during the entire operation the clamp member 60 serves not only as a work-holder, but also as a guard for preventing fragments of the shell flying and injuring the operator, and the clamp further acts as an additional support and guide for the saw-mandrel.

The saws employed are quickly dulled, and it becomes necessary to remove the same for resharpening. To accomplish this, the heads of the saw-chucks are provided with peripheral threads at a point beyond the tapered sockets in which said heads are held. To remove a saw, a tool of the character shown in Fig. 10 is placed within the sleeve 17. This tool is cylindrical in form in order that it may fit over the chuck and has a female thread to engage the threaded portion 72 of the head of the chuck, and said tool is provided with a laterally-extending handle 73, by which it may be held from rotative movement. The sleeve is inserted until the threads 72 of the rotating chuck-head engage with the threads of said sleeve, and the chuck is thus gradually forced outward from its socket and removed.

In the construction shown in Figs. 6, 7, and 8 the corresponding parts at the left of the machine are designated by the same reference-numerals as in Fig. 1, and the construction of this portion of the machine is practically the same as that shown in Fig. 1 with the exception of the work-clamp which surrounds the saw and saw-mandrel. This work-clamp 60' has a flange 74, that extends into the inner end of the sleeve 17 and is held in place by a screw or screws 75. The clamp being thus secured to the sleeve 17 moves backward during the cutting operation against the resistance of the spring 24 in order that the work may pass into contact with the saw. At the right of the machine the disk 15' is provided with bearings for the reception of the unthreaded ends of a plurality of screws 80, the threaded portions of which extend into female screws formed in revoluble members carried by the disk 16 and each constituting a friction-pulley 81 and a hand-wheel 82, the latter being employed for preliminary adjustment of the screws, while the friction-pulley is operated by suitable means for feeding the screws forward during the cutting operation. The rear end of each screw is provided with a head 83, which by engagement with the hub of the pulley 81 limits feeding movement of the screw, so that the latter cannot move beyond a predetermined distance, this distance being greater than the thickness of any ordinary shell or other material from which the blanks are cut.

The front end of each of the screws 80 is recessed for the reception of a tubular workholder 79, having an annular series of teeth for engagement with the blank to be cut, and in this case, as well as in the construction previously described, the teeth preferably face in a direction opposite to that in which the teeth of the cutting-saw are arranged, so that they may the better resist the operation of cutting, although said teeth may be of any suitable character. The tubular work holder or clamp 79 is provided with a central opening for the reception of a plunger 86, the outer end of which is normally in a plane slightly beyond the crowns of the teeth, and said plunger is provided with a reduced stem 87, around which is placed a helical compression-spring 88, tending normally to force the plunger outward for the purpose of forcing the blank to the interior of the saw.

The hand-wheels 82, previously described, are intended to be manipulated by the operator for the purpose of effecting preliminary engagement of the work-holding devices with the object to be cut. After that, during rotation of the disks with the shaft 12 as a center, the friction-wheels 81 will engage a stationary friction-band 90 and will be rotated to effect feeding of the object necessary to accomplish the cutting operation. The friction-band 90 is arranged to engage the friction-wheels 81, and one of its ends is secured to a fixed point, such as a hook or eye 91, while the opposite end is connected by an adjustable spring 92 to a bracket 93, so that the tension of the band may be adjusted as required.

The several disks and shaft 12 may be rotated by hand or by mechanism of any type—as, for instance, by providing the periphery of the disk 15' with teeth to be engaged by a toothed wheel or pinion 94 on the countershaft, and said disks are rotated at a speed that is limited only by the dexterity of the operator, the work being carried on as fast as it is possible for the operator to place the shells between the successive pairs of work-holders. In the operation of this mechanism a shell or other object to be cut is placed by the workman between a pair of work-holders 60' and 79, preferably when the work-holders are directly in front of the workman. The latter then turns the hand-wheel 82 in order to force the work-holder 79 up into engagement with the outer face of the shell, so that the latter will be clamped lightly between the two work-holders. As the several disks continue to rotate with the shaft 12 as a center the friction-disks 81 will be turned by engagement with the stationary friction-belt 90 and the screws 80 will be fed forward, thus forcing the work inward against the saw. During this operation the work-holders 60' are forced back against the stress of the springs, and as the saws are meantime rotating they will cut their way through the shell or other object and will remove therefrom a disk of the size determined by the diameter of the saw, the disk passing within the saw to be delivered in the manner commonly employed in crown-saw machines.

The limit of feeding movement of the screw 80 is determined by the head 83, which comes into contact with the hub of the friction-disk 81, and thus prevents any further movement of the saw. The distance traveled, however, is always greater than the thickness of the largest shell or other object from which disks are to be cut, and the feeding movement is finished before the friction-disk moves from engagement with the belt, the latter part of the movement being idle, while the disk merely slides against the belt or band. This also is of value in case the saw is too dull to cut its way through the disk or proves too hard or "stubborn," as it is termed in this art, in which case the feeding movement will cease as soon as it meets the necessary resistance, and the friction-disk will slide against the belt or band until it reaches the end of the latter.

When the disks leave the band, it is necessary to restore them to the original position—that is to say, to open the work-holders—and this is accomplished by means of a friction-belt 100, running over a pair of pulleys 101, that are driven by gearing 102 from the counter-shaft, the movement imparted to the friction-disks being the reverse of that given by the friction-band, so that the work-holders 79 will be withdrawn in order that a new shell may be introduced between them or a fresh portion of a shell from which one or more disks have been cut, it being here observed that one of the differences between the modified form of machine and that shown in Figs. 1 and 2 is that in the modified construction the shells are released from the clamps at the completion of each cutting operation, while in the construction shown in Figs. 1 and 2 the shell is still held by the clamps and is manually released for a fresh adjustment.

With an apparatus of this class the duty of the workman consists merely in placing the shells in position between the work-holder and effecting the preliminary clamping of the same as distinguished from machines of the ordinary type, where it became necessary to hold the shell until the cutting operation was completed.

The invention may be, of course, applied to ordinary hand-machines where a single cutter is used and in such cases is of advantage in holding the work during the cutting operation.

In order that the pearl surface of the shell may be properly presented squarely to the saw, the clamp member adjacent the saw should have an extended bearing upon the shell—that is, it should engage the shell at a sufficient number of points around the saw to enable the saw to cut the blanks truly on the pearl side.

Having thus described the invention, what is claimed is—

1. In a machine of the class described, a carrier, a longitudinally-movable stem supported thereby, a work-clamp carriage pivoted to the stem, a pair of work-clamps mounted on the carriage, one of said members being yieldable with respect to the other, an operating-lever connected to the yieldable clamp to permit opening movement for the introduction or adjustment of work, and means for effecting the longitudinal movement of the stem.

2. In a blank-cutting machine, a revoluble tubular saw, a yieldably-mounted work-clamp through which said saw extends, a second work-clamp adapted to coact with the first in holding the material to be cut, means for feeding the clamps to present the material to the saw, and a spring forming a backing for the yieldable clamp and tending to resist the feeding movement of both clamps.

3. In a machine of the class described, a rotary clamp-carrier, a clamp pivotally connected thereto, and means for automatically moving the clamp about the pivot into or out of parallelism with the axis of its carrier.

4. In a machine of the class described, the combination with a revoluble carrier, of pivotally-mounted work-clamps supported by the carrier, and means adapted to automatically operate at the completion of each rotative movement of the carrier and move the clamps outward to inoperative position.

5. In a machine of the class described, the combination with a revoluble carrier, of a plurality of longitudinally-movable stems supported by the carrier, a work-clamp carriage pivotally connected to each stem, work-clamps supported thereby, a carriage-operating rod, and a pair of cams, one acting on the stems, and the other on the several rods during revoluble movement of the carrier.

6. In a machine of the class described, the combination with a revoluble carrier, of a plurality of longitudinally-movable stems supported by the carrier, work-clamp carriages pivoted to the stems, clamps on each of the carriages, a rod having a linked connection with each carriage, an antifriction-roller arranged at the outer end of each stem and rod, and fixed cams for engaging the antifriction-rollers during the revoluble movement of the carrier.

7. In a button-blank-cutting machine, the combination of a rotatable tool, a shell-clamp composed of a tubular member adjacent the tool, an opposed member, between which members the shell is to be clamped, and a yieldable shell-positioning device coöperating with said clamp; with means for causing the tool to operate on the shell through the tubular member.

8. The combination with a revoluble saw, of a saw-mandrel, and a pair of clamping members, one of which is tubular and adapted to form an additional support and guide for the saw-mandrel during the cutting operation, and means for causing the saw to enter such tubular member to cut the shell, substantially as described.

9. The combination with a revoluble tubular saw, of a shaft carrying the same, a collar or sleeve surrounding the shaft and extending over the saw, a spring extending over the sleeve and tending to hold the same in place, a work-clamp, means for moving the same in the direction of the saw against the resistance of said spring, and means for adjusting the position of said collar or sleeve with respect to the saw.

10. In a machine of the class described, the combination with a tool, of a work-clamp, and a rotatable work-clamp carrier, means for normally holding the clamp in alinement with the tool, said clamp being pivoted to the carrier, and being movable about the pivot into or out of alinement with the axis of the carrier.

11. In apparatus of the class described, a work-clamp for engagement with one side of the shell, a yieldable shell-positioning device coacting therewith, a yieldable clamp adapted to engage the opposite side of the shell and force it against the first clamp, and a tool for operating on the material while held by said clamps; with manually-operated devices for separating said clamps.

12. In a shell-cutting machine, the combination with a rotary carrier, of longitudinally-movable stems supported thereon, work-clamp carriages pivoted to the stems, means for moving said work-clamp carriages into or out of alinement with the stems, and means for causing the stems to move longitudinally during their orbital movement by the carrier.

13. In a shell-cutting machine, the combination of a rotatable saw, a shell-clamp composed of a relatively fixed member, and an opposed tubular movable member, and a yieldable shell-positioning device coöperating with said clamps to cause the shell to present a plane face to the saw; with means for causing the saw to engage the shell through the tubular member.

14. In a shell-cutting machine, the combination of a pair of shell-holding clamps having clamping-jaws; with an auxiliary yielding member surrounding one of the jaws and forming an initial yieldable support for the shell, the opposed jaw having an extended bearing contact with the shell.

15. In a shell-cutting machine, a pair of clamping members having clamping-jaws, one of the jaws being movable to and from the other; with a yieldable work-supporting member adjacent to one of the jaws and whereby the shell is positioned before it is clamped, the opposed jaw having an extended bearing contact with the shell.

16. In a shell-cutting machine, a shell-clamp member, a shell-positioning spring surrounding said member and coacting therewith and adapted to initially hold the shell in position for clamping; with an opposed clamp having an extended bearing contact with the shell and adapted to first press the shell against the spring, and then firmly bind it against the first clamp.

17. In a machine for cutting button-blanks from shells, the combination with a revoluble tubular saw, of a carriage, a clamp member carried thereby, a second clamp member also carried by said carriage and coöperating with the first clamp member to hold a shell, means for feeding said carriage toward said saw, and yielding means adapted to impinge upon the second clamp member during its movement toward said saw.

In testimony that I claim the foregoing as my own I have hereto affixed my signature in the presence of two witnesses.

JOHN W. MILLER.

Witnesses:
F. W. MAYNAKEES,
JOHN BAKER, Jr.